United States Patent
Iwata et al.

(10) Patent No.: US 6,281,648 B1
(45) Date of Patent: Aug. 28, 2001

(54) THERMISTOR ACTUATED DEVICE FOR CONTROLLING THE DRIVE OF A POWER WINDOW

(75) Inventors: Hitoshi Iwata; Yasushi Nishibe; Kenichi Kinoshita, all of Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 08/357,196

(22) Filed: Dec. 13, 1994

(30) Foreign Application Priority Data

Dec. 16, 1993 (JP) .................................................. 5-316786

(51) Int. Cl.$^7$ ........................................................ H02P 3/00
(52) U.S. Cl. ................................................................ 318/434
(58) Field of Search .............................. 318/434, 280–286, 318/265, 266, 275, 278, 466–470; 49/26, 29; 160/291, 292, 293.1; 361/23–25, 27, 31, 103, 106

(56) References Cited

U.S. PATENT DOCUMENTS

| | | | |
|---|---|---|---|
| 3,636,426 | * | 1/1972 | Buiting .................................... 318/471 |
| 4,394,607 | * | 7/1983 | Lemirande .......................... 318/469 X |
| 4,412,266 | * | 10/1983 | Niino ........................................ 361/24 |
| 4,464,651 | * | 8/1984 | Duhame .................................. 49/25 X |
| 4,611,154 | * | 9/1986 | Lambropoulos et al. ........ 318/434 X |
| 4,716,486 | * | 12/1987 | Sobiepanek et al. ................... 361/24 |
| 5,023,529 | * | 6/1991 | Tennant ............................. 318/466 X |
| 5,130,719 | * | 7/1992 | Nakase et al. .................... 318/266 X |
| 5,264,766 | * | 11/1993 | Tracht et al. ............................ 361/27 |

FOREIGN PATENT DOCUMENTS 59-42276   3/1984   (JP) .
63-18709   5/1988   (JP) .

* cited by examiner

Primary Examiner—Jonathan Wysocki
(74) Attorney, Agent, or Firm—Nixon Peabody LLP; Thomas W. Cole

(57) ABSTRACT

A device for control of driving a power window automatically holds a switch in its operated state to continuously raise or lower a door glass by continuously rotating a motor. The device stops the motor when a locking current flows through the motor upon complete closure or complete open of the door glass. The device includes a thermistor inserted in a signal line through which current flowing through the motor passes. The thermistor is disposed in the vicinity of the motor. When a locking current flows through the motor, the current also flows through the thermistor so that the thermistor is heated and shuts off the current flowing therethrough so as to stop the supply of electricity to the motor when the temperature of the thermistor exceeds a predetermined value. Also, the thermistor has a function of shutting off current flowing therethrough when receiving heat radiated from the motor due to over current.

20 Claims, 5 Drawing Sheets

THERMISTOR ACTUATED DEVICE FOR CONTROLLING THE DRIVE OF A POWER WINDOW

BACKGROUND OF THE INVENTION

1. Field of the Invention

The present invention relates to a device for controlling the drive of a power window. The device makes it possible to control a means both for maintaining the state of a switch operated for raising or lowering a door glass by a driving source such as a motor and for continuing the raising or lowering of the door glass.

2. Description of the Related Art

In a power window apparatus, a motor is usually used for raising and lowering a door glass. When a switch provided in a vehicle compartment (for example, on a door trim) is operated, the motor is driven until the door glass is completely closed or is completely opened.

The switch is designed for two-step operation. When a passenger releases the switch after holding the switch at a position for the first step, the switch is automatically turned off. When the passenger moves the switch to a position for the second step, an iron core having a coil produces magnetic force so that the switch is held in the second step by the magnetic force (magnet type switch). Accordingly, even after the passenger releases the switch, the door glass continues its upward or downward movement until the door glass is completely closed or is completely opened.

In a conventional power window apparatus, a motor current is detected using a resistor having a very small resistance (a shunt resistor) to stop the generation of magnetic force from the iron core (i.e., to shut off the current supplied to the coil) when the door glass is brought into a locked state, which occurs when the door glass is completely closed or is completely opened. As a result, the switch is returned to its off-position by an urging means.

When the switch cannot be returned by the urging means due to mechanical trouble, the supply of power to the motor is continued so that the motor abnormally heats up, which becomes a cause of breakdown. Accordingly, the conventional apparatus is provided with not only a mechanism for shutting off the supply of electricity by stopping the magnetic force but also a bimetallic switch interposed in a power supplying line connected to the motor. When heat is abnormally generated, the supply of electricity is shut off by the bimetallic switch.

However, since the mechanism for shutting off the electricity supplied to the motor must be independently provided for canceling the automatic operation and for preventing the motor from abnormally heating, the number of parts increases, resulting in decreased efficiency of assembly work. Also, since the bimetallic switch has poor reliability, periodic checks are needed, thereby decreasing the efficiency of maintenance work.

SUMMARY OF THE INVENTION

An object of the present invention is to provide an improved apparatus for driving and controlling a power window in which the reliability of a mechanism for shutting off electricity supplied to a driving source such as a motor is increased.

Another object of the present invention is to provide an improved apparatus for driving and controlling a power window in which a mechanism for shutting off electricity can be formed by the same parts regardless of the causes of malfunctions.

Other objects of the present invention will become clear from the following description.

The present invention provides a device for control of driving a power window. The device includes continuation means adapted, once a switch is operated for raising or lowering a door glass by a driving force of a driving source, for automatically holding the operated state of the switch, so as to continuously raise or lower the door glass, and a thermistor disposed in the vicinity of the driving source and to be heated by a driving source locking current which flows through the thermistor upon complete closure or complete opening of the door glass, or to be heated by heat radiated from the driving source itself, so as to shut off electricity supplied to the driving source.

According to the present invention, the thermistor is inserted into the power supplying line. When a locking current of the driving source such as a motor locking current flows through the thermistor, the thermistor heats up and shuts off the current flowing therethrough so as to cancel the self-holding of the switch in the operated state. Accordingly, it is possible to shut off electricity supplied to the driving source with performance comparable to the conventional case in which a locking current is detected using a resistor having a very small resistance.

Also, the thermistor is disposed in the vicinity of the driving source. Hence, the thermistor can shut off the flow of current between both ends of the thermistor when the thermistor is heated by heat from the outside. In the case in which an on-state of the switch is maintained due to mechanical trouble even after the door glass is completely closed or is completely opened, the drive source itself heats up and radiates heat. Due to the radiation of heat, the thermistor is heated to shut off the flow of current between both ends thereof. Accordingly, the supply of electricity to the driving source can reliably be stopped even when any malfunction of the switch occurs.

As described above, since both of detection of ordinary locking current and detection of overheating of the motor can be effected using a single thermistor, the number of parts can be reduced and further the reliability of the apparatus can be increased.

In addition to the thermistor, a timer may be provided to compulsorily stop the supply of electricity after a predetermined period of time has elapsed.

DESCRIPTION OF THE PREFERRED EMBODIMENTS

Figure 2:
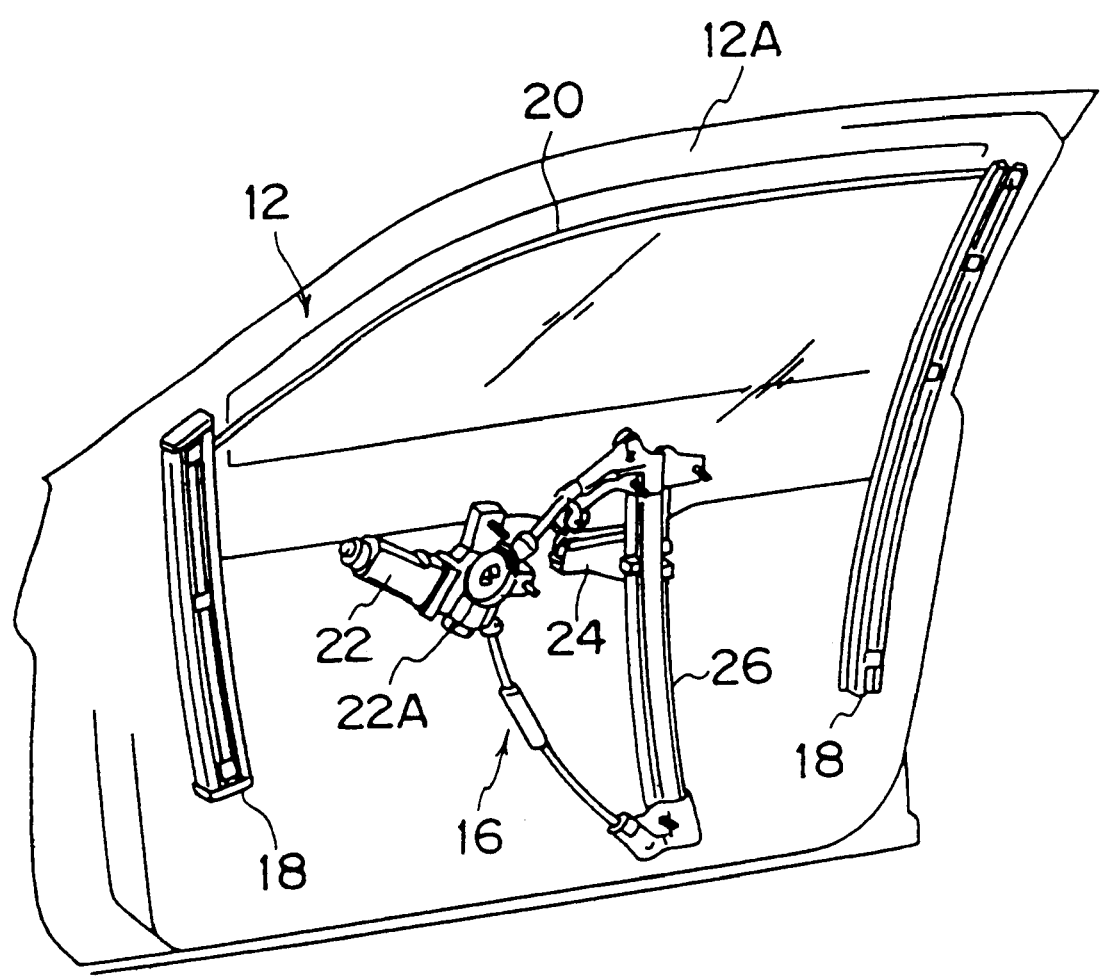
FIG. 2 is a perspective view showing the inside structure of a door of a driver's side.

As shown in FIG. 2, a window regulator 16 used in the present embodiment is a so-called wire type. A wire is wound on a rotary plate 22A attached to the drive shaft of a motor 22. The end of the wire is connected to a holding channel 24 which supports the lower edge of a door glass 20. The holding channel 24 is guided by a main guide 26 for vertical movement. When the motor 22 rotates in the forward direction or the reverse direction, the rotational drive force is transmitted to the holding channel 24 via the wire so that the door glass 20 is raised or lowered along a glass guide 18. The structure of the window regulator 16 is not limited to the wire type, and may be of an X-arm type, or a so-called self-propelled motor type in which a motor itself moves along a rack.

When the door glass 20 is raised by the motor 22, the peripheral edge of the door glass 20 fits into a weatherstrip (not illustrated), which is made of rubber and is assembled in a frame 12A of a door 12, so that the open portion of the door frame 12A is closed. When the door glass 20 is lowered by the motor 22, the open portion of the frame 12A of the door 12 is opened.

The motor 22 is driven in response to operation of an auto/manual switch (not illustrated) attached to a door trim. As the auto/manual switch, for example, a two-step type switch can be used. Such an auto/manual switch can be moved in two steps in each of two opposite directions. In the first step, the motor 22 is driven only while manual operation for the switch continues (manual operation). In the second step, the motor 22 is driven until the door glass 20 reaches a predetermined position even after manual operation for the switch is discontinued (automatic operation). The motor 22 rotates the rotary plate 22A in the forward or reverse direction, so as to raise or lower the door glass 20.

Figure 1:
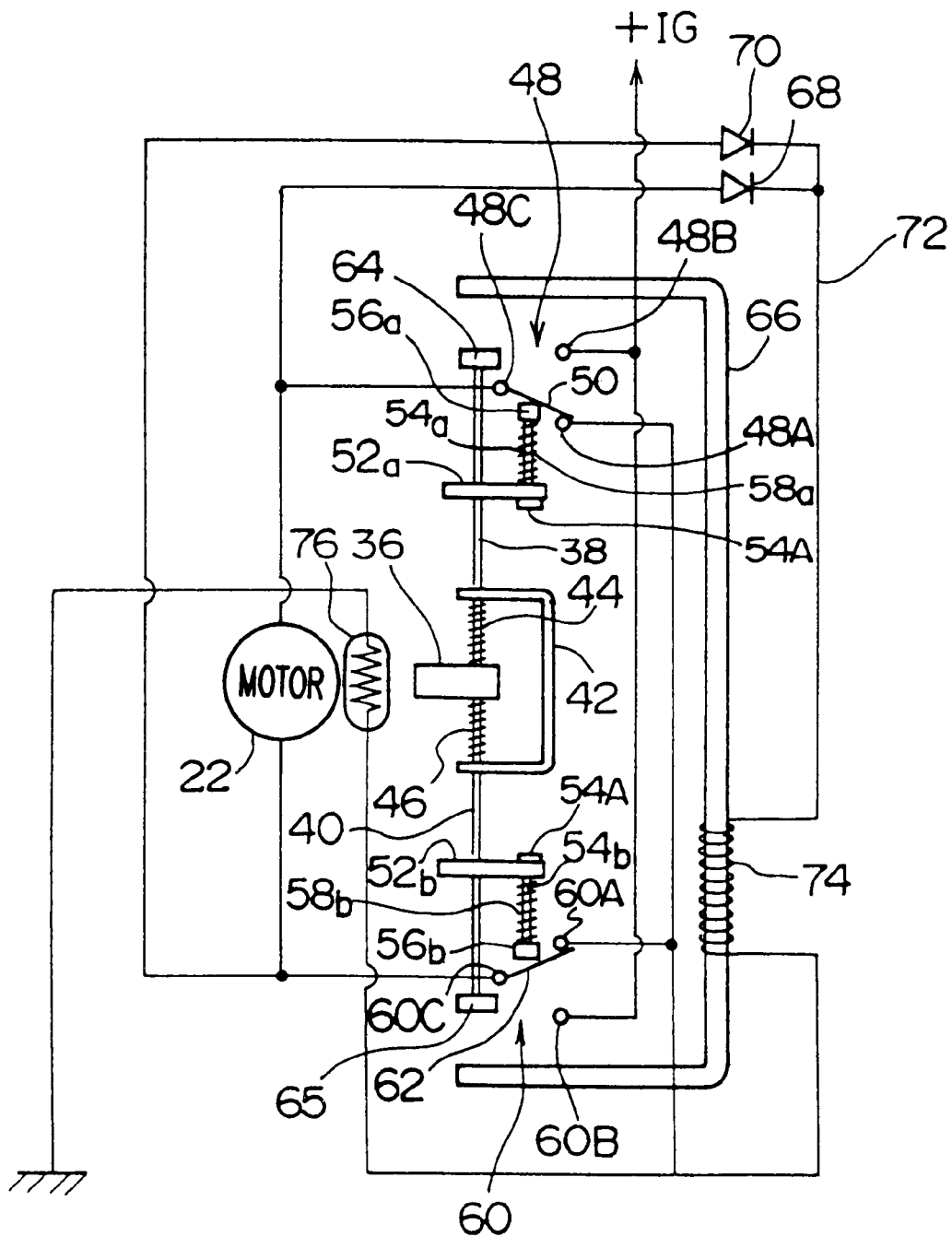
FIG. 1 is a schematic diagram showing a power window driving and controlling circuit in combination with the mechanical structure of a switch, both used in an embodiment of the present invention.

FIG. 1 is a schematic diagram showing a power window driving and controlling circuit in combination with the mechanical structure of the auto/manual switch, both used in the present embodiment.

A pair of movable shafts 38 and 40 are attached, in an axially aligned manner, to both side surfaces of a movable block 36 which is moved in response to operation of the auto/manual switch. These movable shafts 38 and 40 penetrate a substantially C-shaped bracket 42 and are supported thereby. Compressed springs 44 and 46 are disposed between the bracket 42 and the movable block 36 and are supported by the movable shafts 38 and 40. Since the compressed springs 44 and 46 produce the same urging force, the movable block 36 is maintained, at a central position between both ends of the bracket 42, in a balanced state.

The movable shaft 38 extending upward as viewed in FIG. 1 serves to operate a switch 48 for raising the door glass. The switch 48 for raising operation has a common terminal 48C, a first contact 48A, and a second contact 48B. In an ordinary state, a contact 50, which is pivotable about the common terminal 48C, is in contact with the first contact 48A due to an unillustrated urging means.

An operating member 52a is attached to an intermediate portion of the movable shaft 38. The operating member 52a has a rectangular block-like shape and extends in a direction perpendicular to the movable shaft 38. A push shaft 54a having a head portion 54A penetrates the extended end of the operating member 52a, and a pressing member 56a is attached to the tip of the push shaft 54a. Between the pressing member 56a and the operating member 52a, disposed is a compressed spring 58a which generates a force stronger than the force with which the contact 50 of the switch 48 for raising operation is urged to move. Accordingly, the push shaft 54a is urged to move in a direction such that the head portion 54A thereof contacts the operating member 52a.

When the movable block 36 is in its neutral position, the pressing member 56a at the tip of the push shaft 54a is in contact with the contact 50.

When the movable block 36 moves upward as illustrated in FIG. 1, the pressing member 56a presses the contact 50 so that the contact 50 can contact the second contact 48B. Even when the movable block 36 is further moved in the same direction, the contact 50 is not damaged because the push shaft 54a is axially moved against the urging force of the compressed spring 58a.

Similarly, the movable shaft 40 extending downward as viewed in FIG. 1 serves to operate a switch 60 for lowering the door glass. The switch 60 for lowering operation has a common terminal 60C, a first contact 60A, and a second contact 60B. In an ordinary state, a contact 62, which is pivotable about the common terminal 60C, is in contact with the first contact 60A due to an unillustrated urging means.

An operating member 52b is attached to an intermediate portion of the movable shaft 40. The operating member 52b has a rectangular block-like shape and extends in a direction perpendicular to the movable shaft 40. A push shaft 54b having a head portion 54A penetrates the extended end of the operating member 52b, and a pressing member 56b is attached to the tip of the push shaft 54b. Between the pressing member 56b and the operating member 52b, disposed is a compressed spring 58b which generates a force stronger than the force with which the contact 62 of the switch 60 for raising operation is urged to move. Accordingly, the push shaft 54b is urged to move in a direction such that the head portion 54A thereof contacts the operating member 52b.

When the movable block 36 is in its neutral position, the pressing member 56b at the tip of the push shaft 54b is in contact with the contact 62.

When the movable block 36 moves downward as viewed in FIG. 1, the pressing member 56b presses the contact 62 so that the contact 62 can contact the second contact 60B. Even when the movable block 36 is further moved in the same direction, the contact 62 is not damaged because the push shaft 54b is axially moved against the urging force of the compression spring 58b.

Magnetic members 64 and 65 are attached to the tips of the movable shafts 38 and 40, respectively. Both ends of an iron core 66 are arranged to face the magnetic members 64 and 65.

The core 66 is bent in a C-like shape, and is disposed to surround three sides of the switch 48 for raising operation and the switch 60 for lowering operation.

The common terminal 48C of the switch 48 for raising operation is connected to one terminal of the motor 22, while the common terminal 60C of the switch 60 for lowering operation is connected to the other terminal of the motor 22.

Also, the common terminals 48C and 60C of the switch 48 for raising operation and the switch 60 for lowering operation are connected to the anodes of diodes 68 and 70, respectively. The cathodes of the diodes 68 and 70 are connected with each other to form a single signal line 72. A coil 74 wound around the core 66 is interposed in the middle of the signal line 72. The core 66 and the coil 74 form a solenoid.

Accordingly, when current flows through the coil 74, the core 66 generates magnetic force to hold the magnetic members 64 and 65 by the magnetic force.

In detail, when the magnetic member 64 is held by the core 66, the contact 50 of the switch 48 for raising operation is maintained at the second contact 48B. In this case, the motor 22 forwardly rotates to continuously raise the door glass 20. On the contrary, when the magnetic member 65 is held by the core 66, the contact 62 of the switch 60 for lowering operation is maintained at the second contact 60B. In this case, the motor 22 reversely rotates to continuously lower the door glass 20.

The signal line 72 is connected to one end of a thermistor 76. The thermistor 76 is disposed in the vicinity of the motor 22. The other end of the thermistor 76 is grounded. As the thermistor 76, for example, a positive temperature coefficient thermistor may be used.

The first contacts 48A and 60A of the switch 48 for raising operation and the switch 60 for lowering operation are connected to the signal line 72 at a position between the coil 74 and the thermistor 76. Also, the second contacts 48B and 60B are supplied with power (12V) when an unillustrated ignition coil is in an on-state.

The thermistor 76 has a structure for shutting off current flowing between both ends thereof, when the thermistor 76 heats up due to the current flowing therethrough (i.e., current flowing through the signal line 72) and thus the temperature of the thermistor 76 exceeds a predetermined value. The thermistor 76 also has a function of shutting off current flowing therethrough when excessive heat is radiated from the motor 22 due to over current or the like.

The operation of the apparatus according to the present embodiment will now be described.

Figure 3:
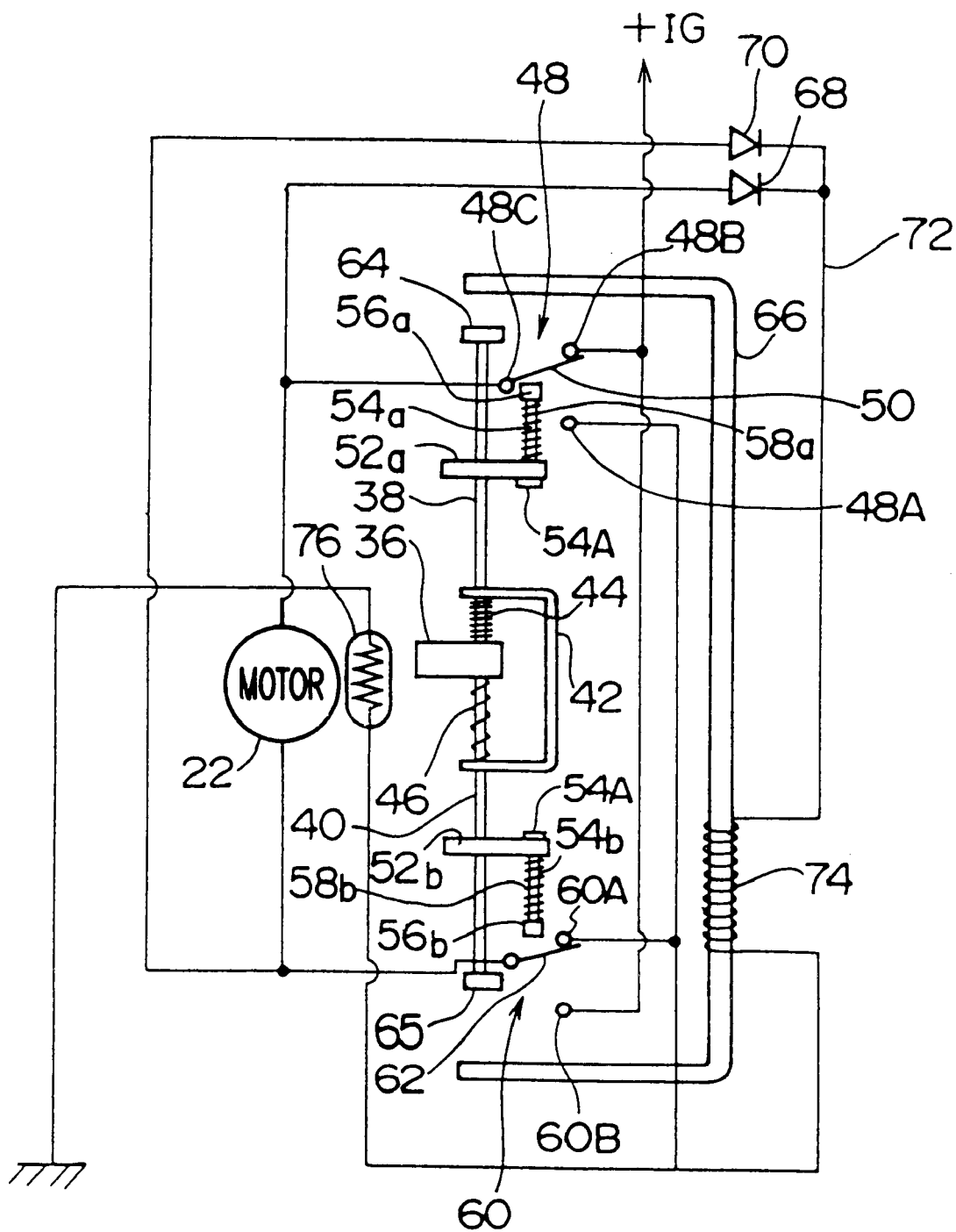
FIG. 3 is a schematic diagram corresponding to FIG. 1 wherein the switch is located at a position for manual operation.

For manual operation, the auto/manual switch is moved to a position for the first step. For example, when the auto/manual switch is moved in one direction to the position for the first step to manually raise the door glass, the movable block 36 does not reach the bracket 42 but moves to an intermediate position (the movable block 36 is raised in FIG. 3). Accordingly, the contact 50 of the switch 48 for raising operation is pushed up by the pressing member 56a of the push shaft 54a so that the contact 50 is switched to the second contact 48B. With this operation, the motor 22 forwardly rotates to raise the door glass 20.

Figure 4:
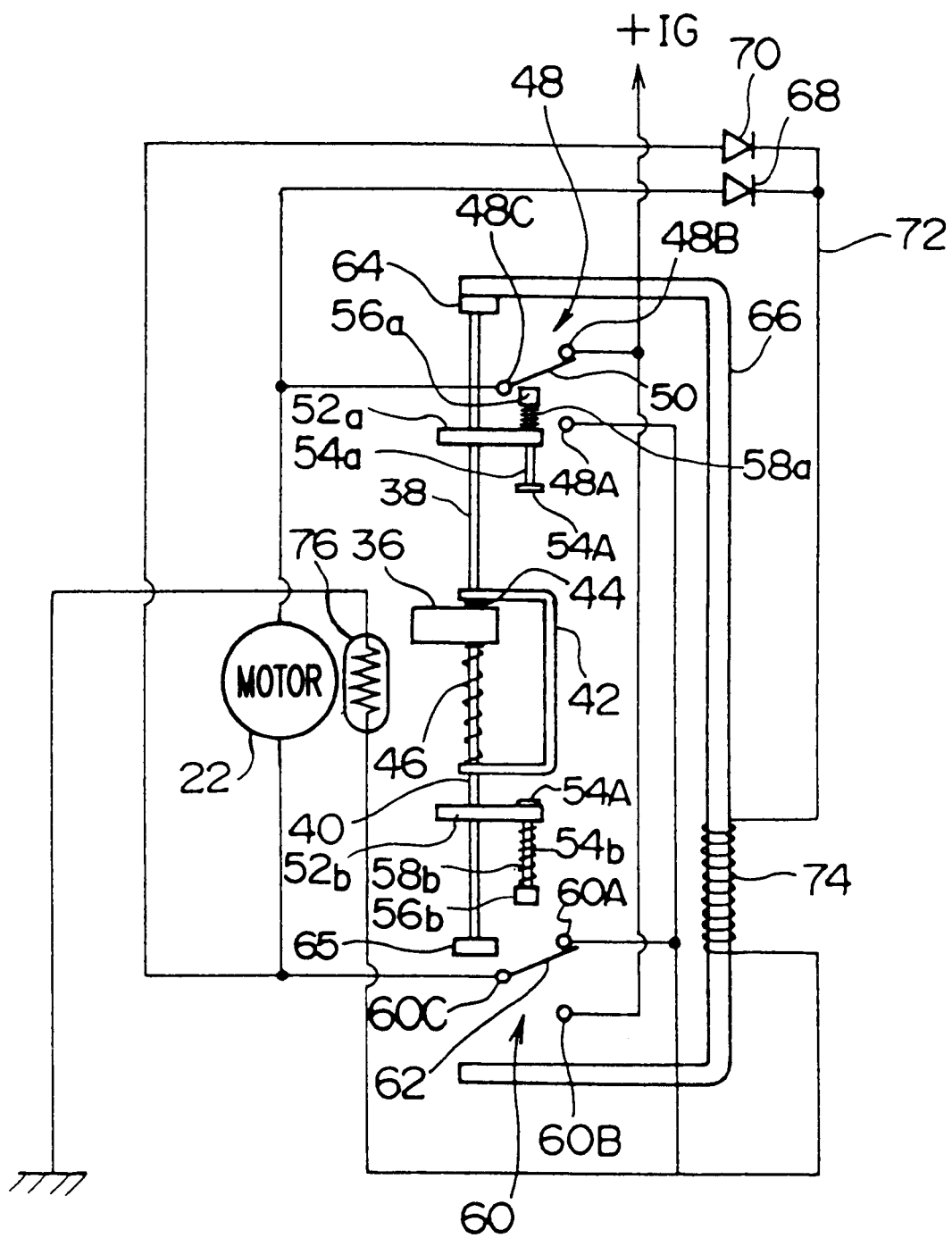
FIG. 4 is a schematic diagram corresponding to FIG. 1 wherein the switch is located at a position for automatic operation.

When the auto/manual switch is further moved to reach a position for the second step, the magnetic member 64 attached to the tip of the movable shaft 38 contacts the core 66 (see FIG. 4).

In this case, the push shaft 54a is axially moved against the urging force of the compressed spring 58a so that the head portion 54A separates from the operating member 52. Accordingly, the contact 50 is not damaged.

The core 66 produces magnetic force when current flows through the coil 74 to drive the motor 22. Thus, the core 66 attracts the magnetic member by the magnetic force. For this reason, even after the passenger releases the auto/manual switch, the auto/manual switch is held in the second step to continue the forward rotation of the motor. As a result, the upward movement of the door glass 20 is automatically continued.

When the door glass 20 is completely closed, a locking current flows through the motor 22. Since the same amount of current flows through the thermistor 76, the thermistor 76 heats up and shuts off the flow of current between both ends thereof. With the shutting off, the generation of magnetic force by the coil 74 is stopped so that the magnetic member 64 is separated from the core 66 by the urging force of the compressed springs 44 and 46 and is returned to its balanced position. Thus, the contact 50 of the switch 48 for raising operation returns to the first contact 48A by the above-described operation, so as to stop the supply of electricity to the motor 22. As described above, the supply of electricity to the motor 22 is automatically stopped upon the complete closure of the door glass 20.

When the door glass 20 is lowered, operation similar to the above is carried out.

In the case in which the movable block 36 does not return to the balanced position due to some cause even after the magnetic force of the core 66 is lost, the state is maintained in which the contact 50 of the switch 48 for raising operation is in contact with the second contact 48B. When this state continues, the amount of current flowing through the motor 22 becomes excessive, and generates heat. Since the thermistor 76 is disposed in the vicinity of the motor 22, the thermistor 76 is heated from the outside due to heat radiated from the motor 22. The heat results in shutting off the current flowing through the thermistor 76. Accordingly, the supply of electricity to the motor 22 is stopped. As described above, the supply of electricity to the motor 22 can be shut off even in the case in which the auto/manual switch does not return to the neutral position due to mechanical trouble. A malfunction caused from overheating therefore can be prevented.

In the present embodiment, both of canceling self-holding of the auto/manual switch and shutting off electricity supplied to the motor 22 are effected by a single thermistor. Accordingly, the number of parts becomes very small, thereby facilitating assembly work. Also, since the operation of the thermistor 76 is reliable, maintenance work hardly becomes necessary.

Figure 5:
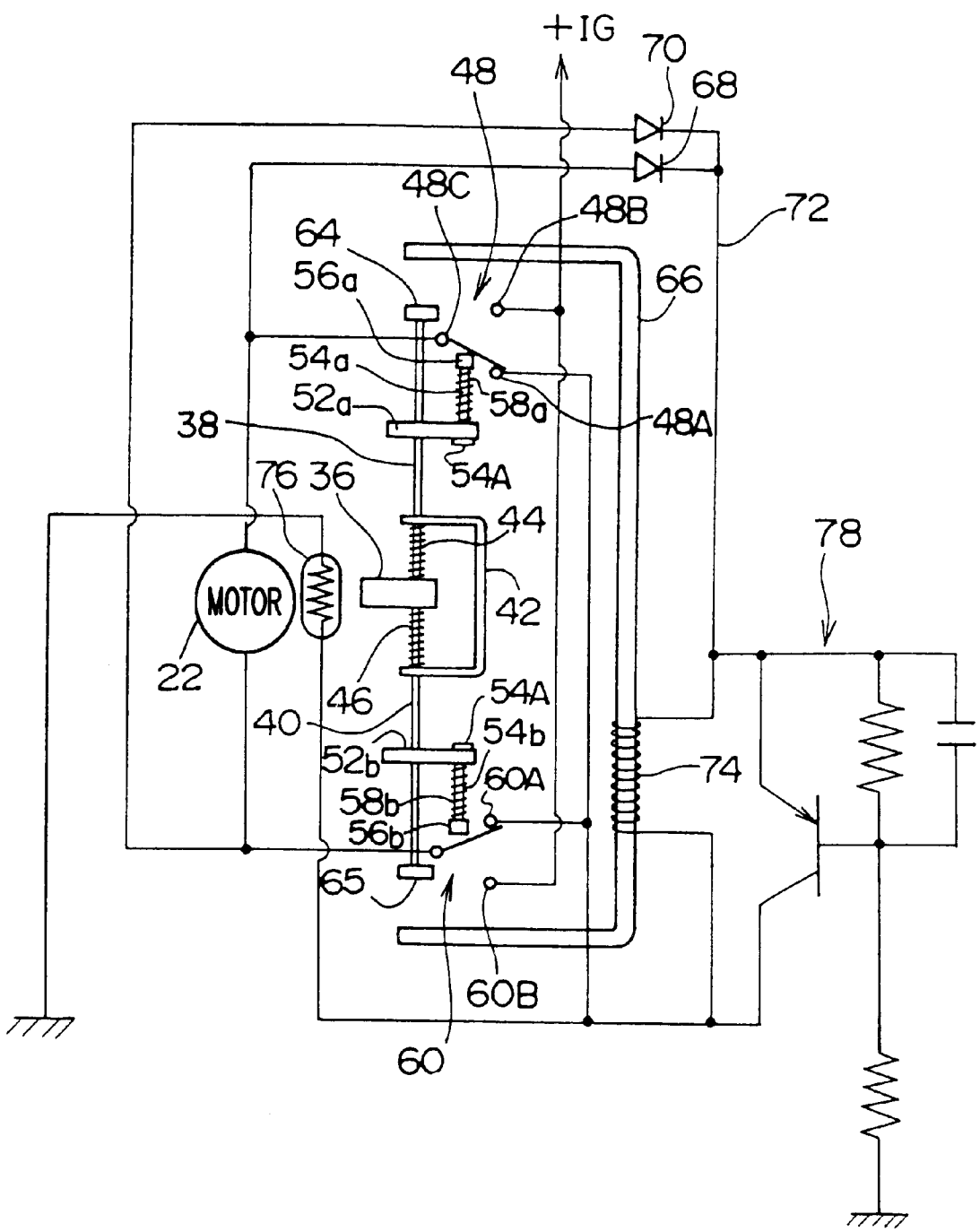
FIG. 5 is a schematic diagram including an additional timer circuit.

In the present embodiment, the reliability of the apparatus can greatly be increased through the use of a single thermistor, compared with conventional apparatus. However, to enhance the reliability more, a timer circuit 78 may be added, as shown in FIG. 5, to compulsorily stop the supply of electricity to the coil 74 when the supply of electricity to the motor 22 is continued for a predetermined period (a period longer than the time required to move the door glass 20 from the completely opened position to the completely closed position, or from the completely closed position to the completely opened position).

As described above, the device for driving and controlling a power window according to the present invention has an advantageous effect that it increases the reliability of the mechanism for shutting off electricity supplied to a motor, and that the mechanism for shutting off electricity can be formed by the same parts regardless of causes of malfunctions.

What is claimed is:

1. A device for controlling the drive of a power window, wherein said drive includes a switch that, when moved into an operated state, actuates an electrically powered driving source to raise or lower a door glass comprising:

an automatic continuation means for automatically holding the operated state of the switch so as to continuously raise or lower the door glass; and a thermistor means disposed in the vicinity of the driving source for shutting off electricity to the driving source as a result of heat generated by a driving source locking current which flows through the thermistor upon complete closure or complete opening of the door glass, and for shutting off electricity supplied to the driving source as a result of heat generated by the driving source from an overload condition.

2. A device for controlling the drive of a power window according to claim 1, wherein said automatic continuation means comprises a solenoid.

3. A device for controlling the drive of a power window according to claim 2, wherein said driving source is a motor.

4. A device for controlling the drive of a power window according to claim 3, wherein upward and downward movements of the door glass are effected by forward and reverse rotations of said motor.

5. A device for controlling the drive of according to claim 1, further comprising a timer circuit for stopping the supply of electricity after a predetermined period has elapsed, even when said thermistor does not function to shut off electricity from said driving source.

6. A device for controlling the drive of a power window, wherein said drive includes a driving source for raising or lowering a door glass when connected to a source of electrical power, and a switch means manually operable to start and stop a supply of electricity to the driving source, comprising:

an automatic continuation means for automatically holding said switch means in its on-state, and a thermistor means disposed in the vicinity of the driving source and electrically connected between said driving source and source of electrical power for shutting off said power to said driving source when heated by a driving source locking current which flows through the thermistor upon complete closure or complete opening of the door glass, and for shutting off electricity to said driving source when heated by heat radiated from the driving source itself as a result of an overload condition.

7. A device for controlling the drive of a power window according to claim 6, wherein said automatic continuation means comprises a solenoid for maintaining said switch in its on-state.

8. A device for controlling the drive of a power window according to claim 6, wherein said switch is provided for each of operations for raising and lowering the door glass.

9. A device for controlling the drive of a power window according to claim 8, wherein the switch for raising operation is interlocked with the switch for lowering operation such that one of the switches is automatically turned off when the other of the switches is turned on.

10. A device for controlling the drive of a power window according to claim 9, wherein the switches for raising and lowering the door glass are switches, in their on-state, capable of reversing the direction of supply of electricity to the driving source.

11. A device for controlling the drive of a power window according to claim 10, wherein each of the switches comprises an urging means for holding its off-state, and a resisting means for resisting urging force of the urging means when the switch is in its on-state.

12. A device for controlling the drive of a power window according to claim 11, wherein said continuation means comprises a solenoid for maintaining said switch in its on-state.

13. A device for controlling the drive of a power window according to claim 12, further comprising a timer circuit for stopping the supply of electricity after a predetermined period has elapsed, even when said thermistor does not function.

14. A device for controlling the drive of a power window, wherein said drive includes a driving source for raising or lowering a door glass when connected to a source of electrical power, and a switch for connecting and disconnecting said driving source to said source of electrical power, comprising:

a switch operating section for operating said switch;

an automatic continuation means for automatically holding said switch in its on-state;

an automatic continuation means operating section for initiating the operation of said automatic continuation means; and a thermistor means disposed in the vicinity of the driving source for shutting off electrical power to the driving source as a result of heat generated by a driving source locking current which flows through the thermistor upon complete closure or complete opening of the door glass, and for shutting off electrical power to the driving source as a result of heat radiated from the driving source itself as a result of an overload condition so as to cancel the operation of said automatic continuation means.

15. A device for controlling the drive of a power window according to claim 14, wherein said automatic continuation means comprises a solenoid for maintaining said switch in its on-state.

16. A device for controlling the drive of a power window according to claim 14, wherein said switch, said switch operating section, said automatic continuation means, and said automatic continuation means operating section are provided for each of operations for raising and lowering the door glass.

17. A device for controlling the drive of a power window according to claim 16, wherein the switch for raising operation is interlocked with the switch for lowering operation such that one of the switches is automatically turned off when the other of the switches is turned on.

18. A device for controlling the drive of a power window according to claim 14, wherein said switch operating section and said automatic continuation means operating section are the same structural component.

19. A device for controlling the drive of a power window according to claim 17, wherein the switches for raising and lowering the door glass are switches, in their on state, capable of reversing the direction of supply of electricity to the driving source.

20. A device for controlling the drive of a power window according to claim 14, further comprising a timer circuit for stopping the supply of electricity after a predetermined period has elapsed, even when said thermistor does not function.

* * * * *